United States Patent
Bae et al.

(10) Patent No.: US 11,873,790 B2
(45) Date of Patent: Jan. 16, 2024

(54) HIGH-POWER-GENERATING VORTEX WINDMILL APPARATUS OF INTEGRAL ROTOR

(71) Applicant: SEA & SKY TECH.LAB CO., LTD, Busan (KR)

(72) Inventors: Heon Mee Bae, Busan (KR); Jung Ho Bae, Busan (KR); Je Won Lee, Daejeon (KR)

(73) Assignee: SEA & SKY TECH.LAB CO., LTD, Busan (KR)

( * ) Notice: Subject to any disclaimer, the term of this patent is extended or adjusted under 35 U.S.C. 154(b) by 0 days.

(21) Appl. No.: 17/922,668

(22) PCT Filed: Jun. 2, 2021

(86) PCT No.: PCT/KR2021/006846
§ 371 (c)(1),
(2) Date: Nov. 1, 2022

(87) PCT Pub. No.: WO2021/261792
PCT Pub. Date: Dec. 30, 2021

(65) Prior Publication Data
US 2023/0287861 A1    Sep. 14, 2023

(30) Foreign Application Priority Data
Jun. 26, 2020   (KR) .......................... 10-2020-0078467

(51) Int. Cl.
*F03D 1/06*    (2006.01)

(52) U.S. Cl.
CPC .... *F03D 1/0625* (2013.01); *F05B 2240/3062* (2020.08)

(58) Field of Classification Search
CPC .... F03D 1/0625; F03D 1/0608; F03D 1/0606; F03D 1/0602; F03D 1/06; F05B 2240/3062
See application file for complete search history.

(56) References Cited

U.S. PATENT DOCUMENTS

| | | | | | |
|---|---|---|---|---|---|
| 508,009 | A | * | 11/1893 | George | B63H 5/10 416/170 R |
| 4,720,640 | A | * | 1/1988 | Anderson | F03D 13/20 290/43 |

(Continued)

FOREIGN PATENT DOCUMENTS

| CN | 114696726 A | * | 7/2022 |
|---|---|---|---|
| GB | 2490170 A | * | 10/2012 |

(Continued)

*Primary Examiner* — David E Sosnowski
*Assistant Examiner* — Theodore C Ribadeneyra
(74) *Attorney, Agent, or Firm* — NKL LAW; Jae Youn Kim (57) ABSTRACT

A high-power generating vortex windmill apparatus of an integrated-type rotor is proposed. The high-power generating vortex windmill apparatus includes a central shaft fence coupled to an outside portion of a rotary shaft to be spaced apart from the rotary shaft, a plurality of boundary fences concentrically coupled to an outside portion of the central shaft fence and arranged to be spaced apart from each other, a circumferential wing of which one end is coupled to the rotary shaft, radially arranged, and coupled to the central shaft fence and the plurality of boundary fences by passing therethrough, a plurality of slipstream rings respectively inserted among the plurality of boundary fences and concentrically arranged, and a slipstream ring support simultaneously attached and fixed to the plurality of slipstream rings, installed such that opposite ends thereof respectively connect an inner boundary fence to an outer boundary fence.

6 Claims, 8 Drawing Sheets

(56) References Cited

U.S. PATENT DOCUMENTS

| | | | | |
|---|---|---|---|---|
| 8,317,469 B2* | 11/2012 | Kinzie | ............... | F03D 1/04 415/211.2 |
| 8,714,923 B2* | 5/2014 | Presz, Jr. | ............... | F03D 1/04 415/220 |
| 271,216 A1 | 9/2014 | Syrovy | | |
| 9,803,616 B2* | 10/2017 | Port | ............... | F03D 7/0224 |
| 171,966 A1 | 6/2018 | James et al. | | |
| 10,066,597 B2* | 9/2018 | Sutz | ............... | F03D 1/025 |
| 2005/0214119 A1* | 9/2005 | Miller | ............... | F03D 1/025 416/126 |
| 2006/0257251 A1* | 11/2006 | Carlson | ............... | F04D 29/544 415/178 |
| 2009/0230691 A1* | 9/2009 | Presz, Jr. | ............... | F03D 1/04 290/55 |
| 2010/0028132 A2* | 2/2010 | Presz, Jr. | ............... | F03D 1/04 415/220 |
| 2011/0058937 A1* | 3/2011 | Presz, Jr. | ............... | F03D 1/04 415/221 |
| 2011/0304153 A1* | 12/2011 | Schum | ............... | F03D 9/25 290/55 |
| 2013/0315732 A1* | 11/2013 | Sutz | ............... | F03D 1/0625 416/9 |
| 2014/0044535 A1* | 2/2014 | Wood | ............... | F03D 1/0625 415/207 |
| 2014/0361543 A1* | 12/2014 | Miro | ............... | F03D 1/0625 290/55 |
| 2018/0171966 A1* | 6/2018 | Smyth | ............... | F03D 1/04 |

FOREIGN PATENT DOCUMENTS

| | | | |
|---|---|---|---|
| JP | 6378366 B2 | * | 8/2018 |
| JP | 6378366 B2 | | 8/2018 |
| KR | 10-2039700 B1 | | 11/2019 |
| KR | 102039700 B1 | * | 11/2019 |
| KR | 102170798 B1 | * | 10/2020 |
| KR | 20220140204 A | * | 10/2022 |
| KR | 102529368 B1 | * | 5/2023 |
| WO | 2010-062788 A2 | | 6/2010 |
| WO | WO-2010062788 A2 | * | 6/2010 |

* cited by examiner

HIGH-POWER-GENERATING VORTEX WINDMILL APPARATUS OF INTEGRAL ROTOR

TECHNICAL FIELD

The present disclosure relates to a high-power-generating vortex windmill apparatus of an integral rotor. More particularly, the present disclosure relates to a high-power-generating vortex windmill apparatus of an integral rotor, wherein an integral-rotor-shaped structure in a multi stage installed at a front portion of a fixed slipstream multi stage structure strongly rotates by an exciting force of a 3-dimentional vortex outflow flowing out between the 2 structures that cross each other at a regular interval.

BACKGROUND ART

In general, wind power generation converts kinetic energy of air into mechanical energy by rotating a windmill using aerodynamic property, and generates electricity by using the mechanical energy. For the wind power generation, depending on a direction of a rotary shaft with respect to the ground, a propeller-type windmill in the form of a horizontal shaft is mainly used (wind power generator: Korean Patent No. 10-1027055, registered on Mar. 29, 2011), which is widely used from application to a large-scale power system to independent small power sources in remote islands and mountains. Since wind power varies greatly with time, when wind power is used as an independent power source, wind power generation is used in combination with a storage device such as a storage battery or with other power generation methods. The propeller-type windmill, which is currently known as the best windmill applied to the wind power generator, is used as a large type having a propeller wing the length of 10 m to 50 m, and when the length of a subtense line at a front end of the propeller wing is increased, air resistance is increased and rotation speed is reduced. Therefore, in terms of rotational efficiency, a form of increasing the rotational speed by thinning the front end of the propeller win is becoming mainstream of the windmill, and 3 or 4 wings are applied to a front end of a generation part in the form of radial coupling. However, when wind speed is small (breezy wind), the windmill does not rotate smoothly due to a resistance force, and the windmill does not rotate at all below about 3 m/s. When the wind speed is about 25 m/s or more (strong wind), the propeller wing is damaged, so that an angle of the propeller wing is changed and no rotational force is generated, and the rotation is stopped. When the propeller wing having the above structure rotates, a lot of noise is made, and a problem of environmental destruction occurs due to construction of a large-scale infrastructure according to the amount of power generation.

Accordingly, the present applicant has applied for Korean Patent No. 10-2039700 (related art).

Figure 8:
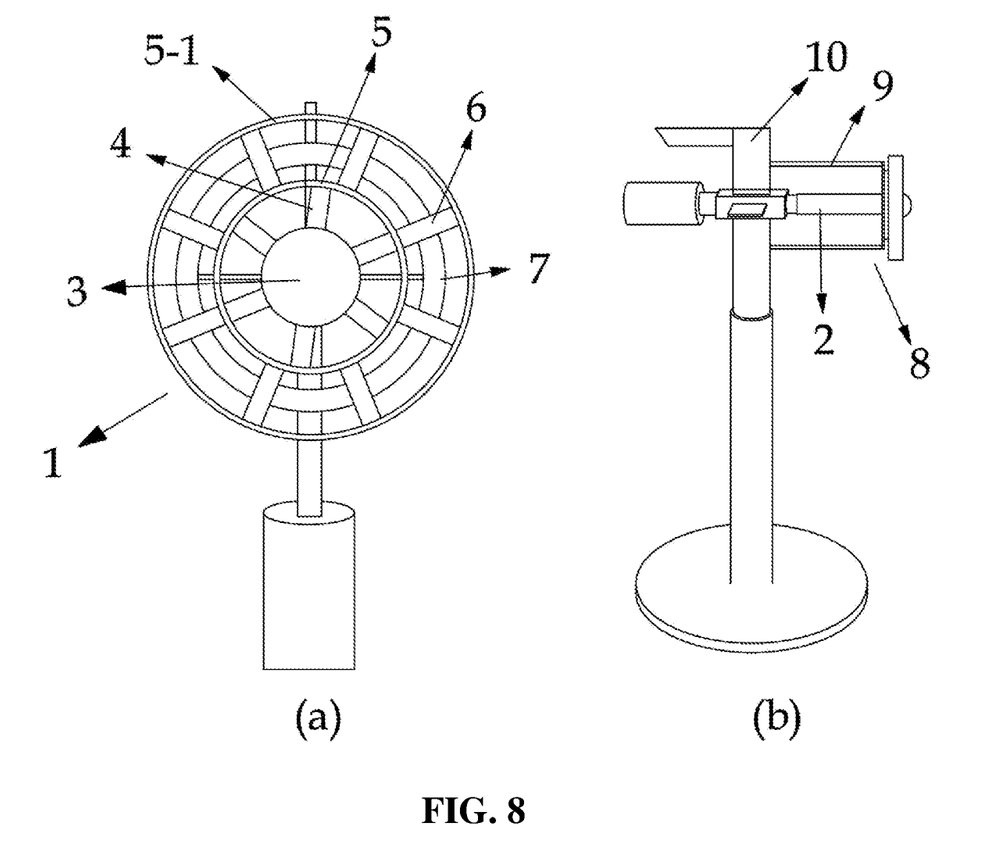
FIG. 8 is a view showing a high-power-generating vortex windmill apparatus according to the related art.

FIG. 8 is a view showing the related art. Referring to the drawing, a high-power-generating vortex windmill wing includes: a rotation wind part 1 including a front end portion 3 located at a front end of a rotary shaft of a windmill, a plurality of front end supporters 4 formed on an circumferential surface of the front end portion, a front end boundary membrane boundary fence 5 formed on an end of the plurality of front end supporters, a plurality of circumferential wings 6 formed on the front end boundary membrane boundary fence, and a first boundary membrane boundary fence 5-1 formed on an end of the plurality of circumferential wings; and a slipstream ring part 8 including a slipstream ring 7 arranged at a rear surface of the rotation wing part, and a plurality of slipstream ring supports 9 supporting the slipstream ring. A plurality of circumferential wings is formed among the front end boundary membrane boundary fence 5 and the first boundary membrane boundary fence 5-1, so that generation of vortex flowing out between the rotation wind part 1 and the slipstream ring part 8 is increased to maximize an exciting force, thereby generating high power.

Meanwhile, as a result of using the related art, there were several problems.

The slipstream ring supports 9 are provided to connect the slipstream ring 7 to a slipstream ring support shaft 10, but as the length of each slipstream ring support is increased, there is high risk of deformation, and when slipstream ring supports 9 are deformed, a risk of impeding rotational operations of the slipstream ring and the circumferential wings occurs.

Furthermore, as the length of each slipstream ring support is increased, securement of space for the slipstream ring support is required and a disadvantage of increasing the volume of the apparatus occurs.

Furthermore, when a plurality of slipstream rings is concentrically arranged in multi stage, in other words, the plurality of slipstream rings of different diameters is concentrically arranged, an effect of increasing output occurs, but the long slipstream ring supports should be arranged in a rearward direction for each of the plurality of slipstream rings. In this case, the plurality of slipstream ring supports should be installed so that the structure thereof is complicated, and a risk of damages is inevitably increased.

DISCLOSURE

Technical Problem

The present disclosure is proposed to improve Korean Patent No. 10-2039700, which is the precedent invention of the applicant, and the present disclosure is intended to provide a high-power generating vortex windmill apparatus of an integral rotor, wherein the apparatus is configured to improve the performance by removing a long slipstream ring support horizontally connecting a slipstream ring to a slipstream ring support shaft so that the volume thereof may be reduced and a risk of damages is significantly reduced.

Technical Solution

An objective of the present disclosure is to provide a high-power-generating vortex windmill apparatus, which is configured to generate high power by using a multi-stage vortex windmill wing, of an integral rotor, the apparatus including: a central shaft fence coupled to an outside portion of a rotary shaft to be spaced apart from the rotary shaft; a plurality of boundary fences concentrically coupled to an outside portion of the central shaft fence and arranged to be spaced apart from each other, and coupled to each other to have different diameters from an inside space to an outside space; a plurality of first circumferential wings of which one end is connected to the rotary shaft, which is radially arranged, and coupled to the central shaft fence and the plurality of boundary fences by passing therethrough; a plurality of second circumferential wing inserted among the plurality of boundary fences and of which opposite ends are coupled to the plurality of boundary fences, which are radially arranged around the rotary shaft; a plurality of slipstream rings inserted among the plurality of boundary fences and concentrically arranged; and a slipstream ring support simultaneously attached and fixed to the plurality of slipstream rings, installed such that opposite ends thereof respectively connect an inner boundary fence to an outer boundary fence.

According to another embodiment, the apparatus may include a slipstream ring supporter of which opposite ends are respectively connected to a lower surface of the plurality of slipstream rings and an upper surface of a second circumferential wing.

Advantageous Effects

According to the present disclosure, as the long slipstream ring support horizontally connecting the slipstream rings to the slipstream ring support shaft is omitted, the volume of the apparatus can be reduced and the risk of damages can be significantly reduced, so that there is an effect of improving the performance thereof.

Furthermore, when the plurality of slipstream rings are concentrically arranged in multi stage, in other words, the plurality of slipstream rings of different diameters are concentrically arranged, there can be an effect of increasing output, and as the long slipstream ring supports arranged rearward for each the slipstream rings as the conventional apparatus are omitted, the structure of the apparatus can be simple and the reliability thereof can be improved.

BEST MODE

Hereinbelow, exemplary embodiments of the present disclosure will be described in detail with reference to accompanying drawings.

The terms described below are defined in consideration of functions in the present disclosure, and are specified as having concepts consistent with the technical sprit and scope of the present disclosure and meanings commonly recognized in the art.

Furthermore, when it is decided that the detailed description of known function or configuration related to the present disclosure makes the subject matter of the present disclosure unclear, the detailed description is omitted.

Herein, the accompanying drawings are shown by exaggerating or simplifying a part to provide an easily understood description of the structure of the present invention, and each part does not exactly match the actual size.

Figure 1:
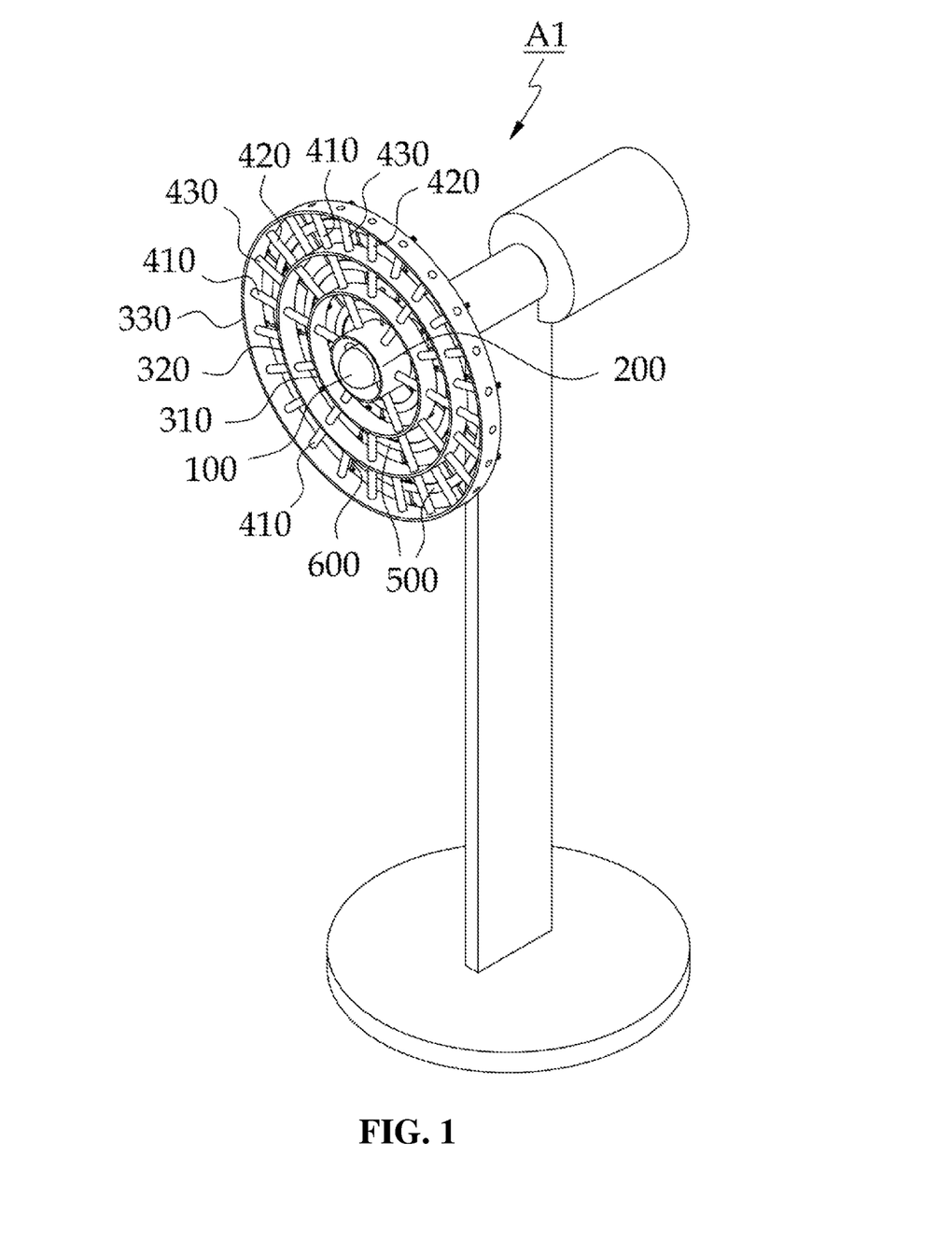
FIG. 1 is a perspective view showing a high-power-generating vortex windmill apparatus of an integral rotor according to an embodiment.
Figure 2:
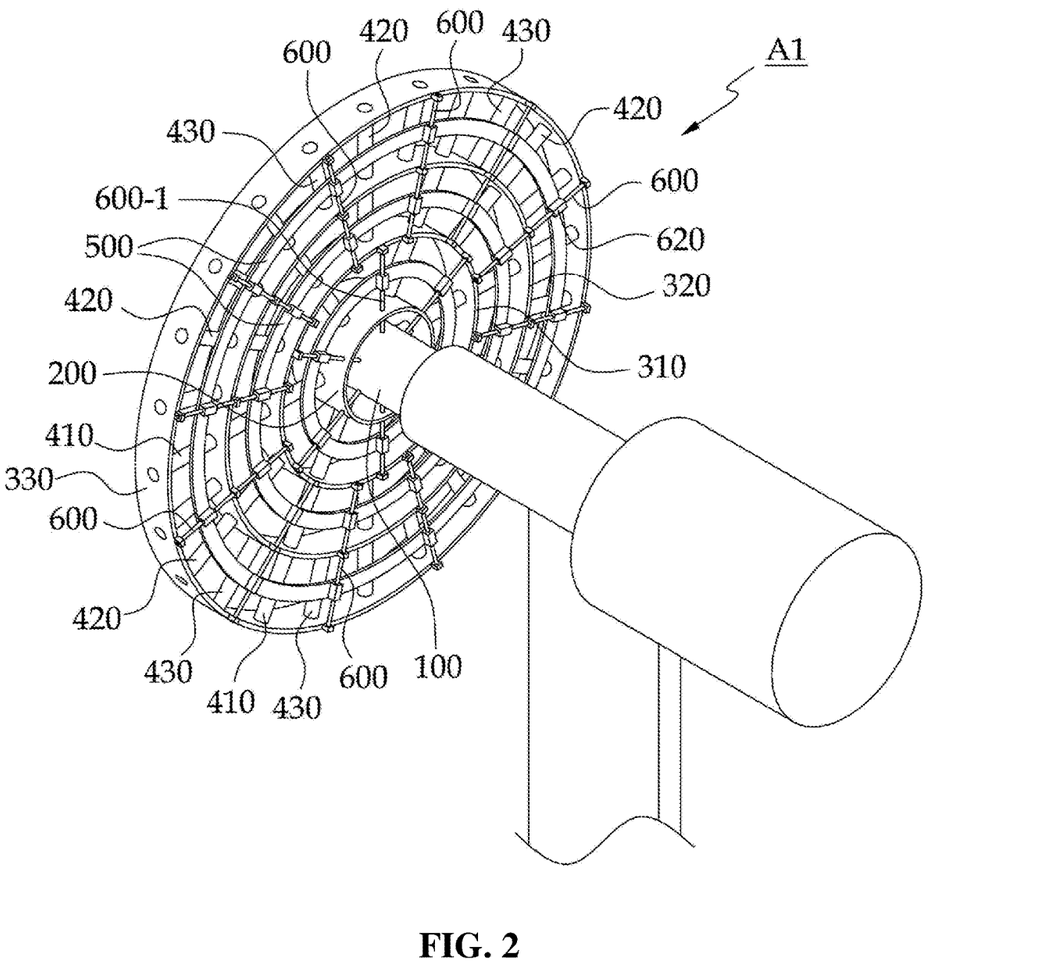
FIG. 2 is a rear-perspective view showing the high-power-generating vortex windmill apparatus of an integral rotor according to the embodiment.
Figure 5:
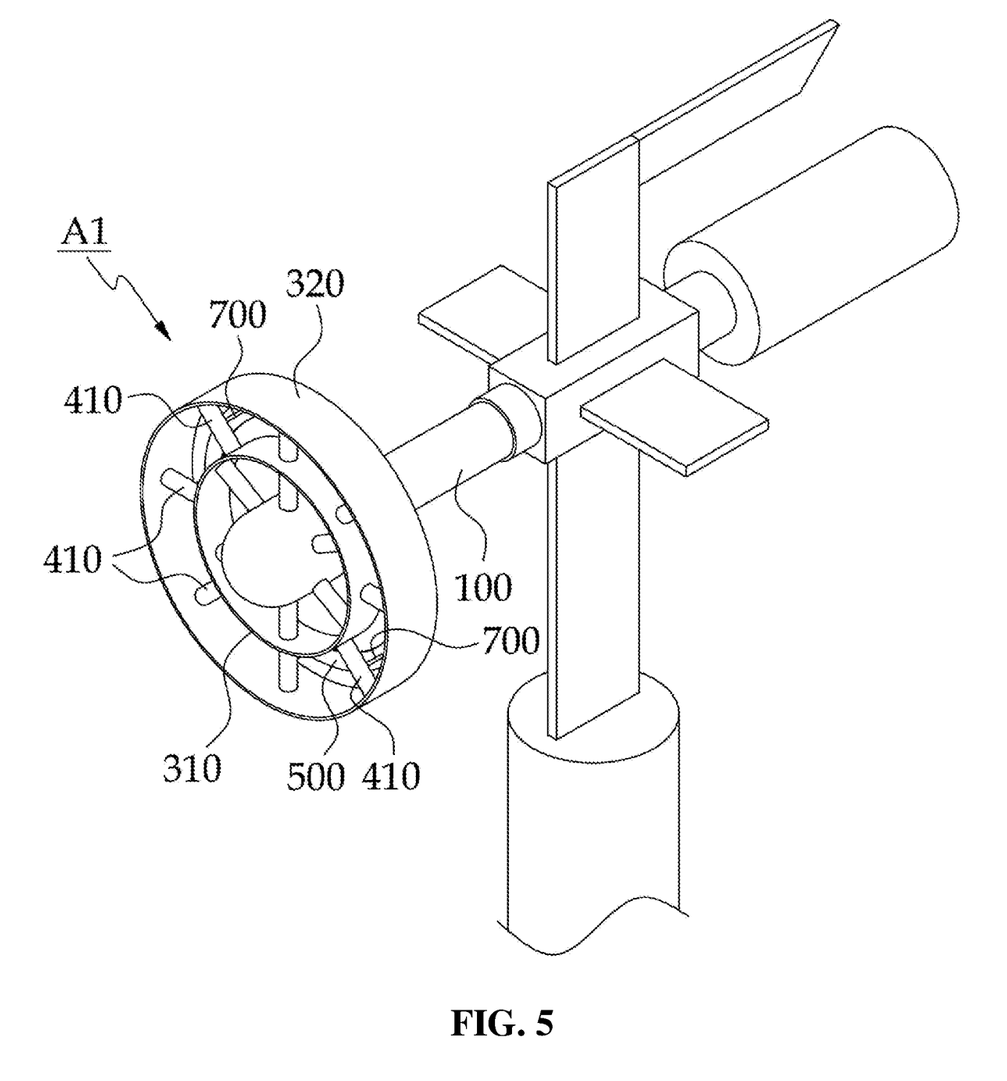
FIG. 5 is a perspective view showing a high-power-generating vortex windmill apparatus of an integral rotor according to another embodiment.
Figure 6:
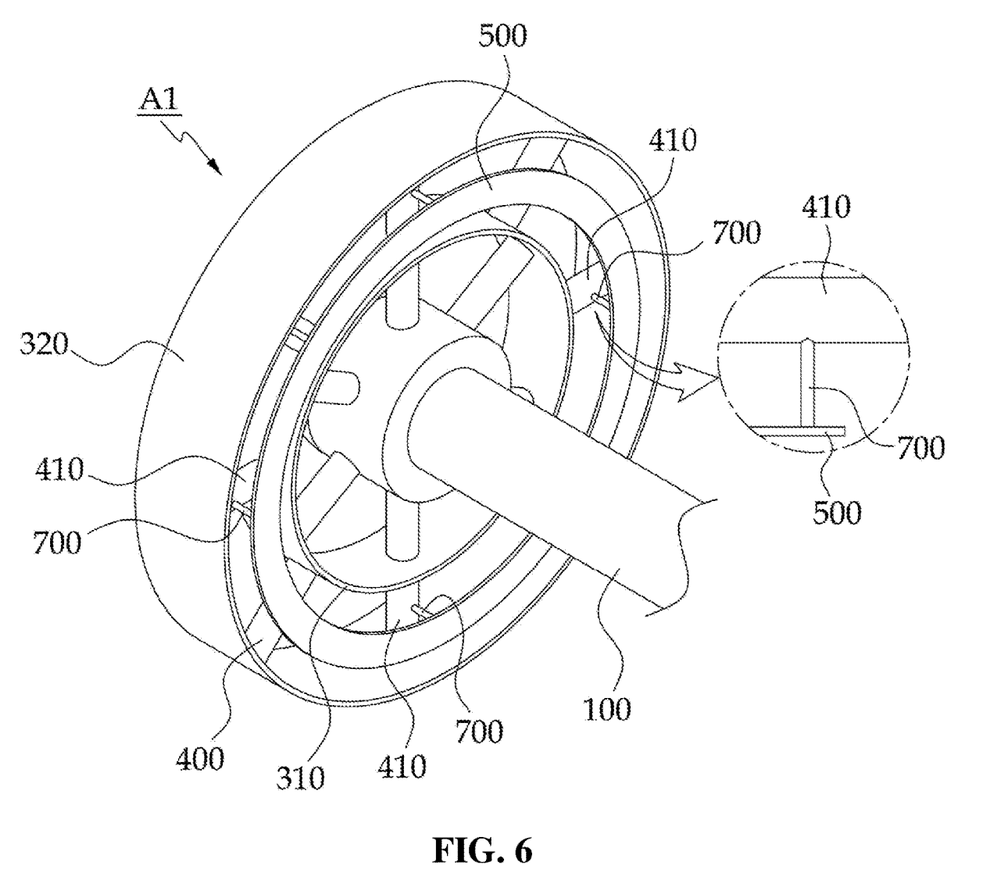
FIG. 6 is a rear-perspective view of FIG. 5.
Figure 7:
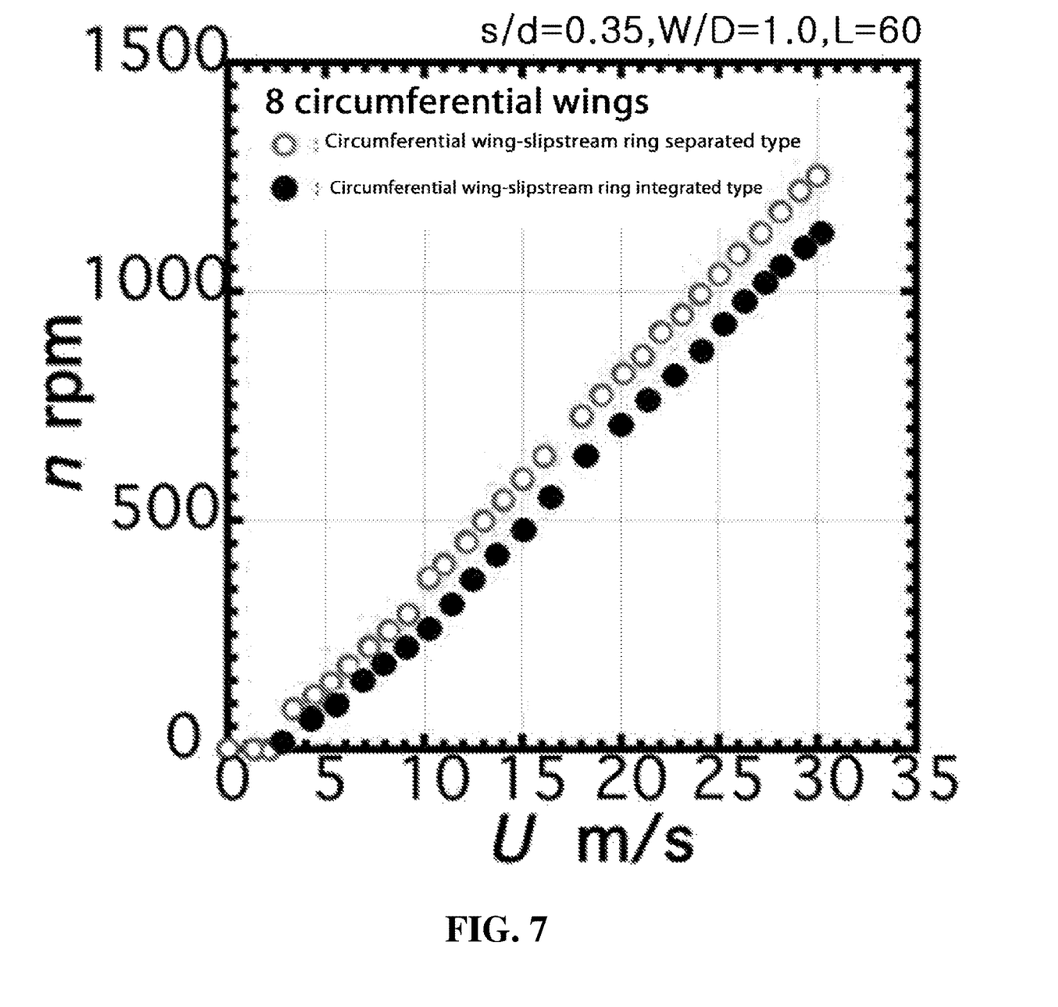
FIG. 7 is a relationship graph showing relationship between wind velocity, the number of revolutions, and the number of the circumferential wings according to the present disclosure.

In the accompanying drawings, FIG. 1 is a perspective view showing a high-power-generating vortex windmill apparatus of an integral rotor according to an embodiment. FIG. 2 is an enlarged-perspective view showing the high-power-generating vortex windmill apparatus of an integral rotor according to the embodiment. FIG. 5 is an enlarged-perspective view showing the high-power-generating vortex windmill apparatus of an integral rotor according to another embodiment. FIG. 7 is a relationship graph showing relationship between wind velocity, the number of revolutions, and the number of the circumferential wings according to the present disclosure.

Figure 3:
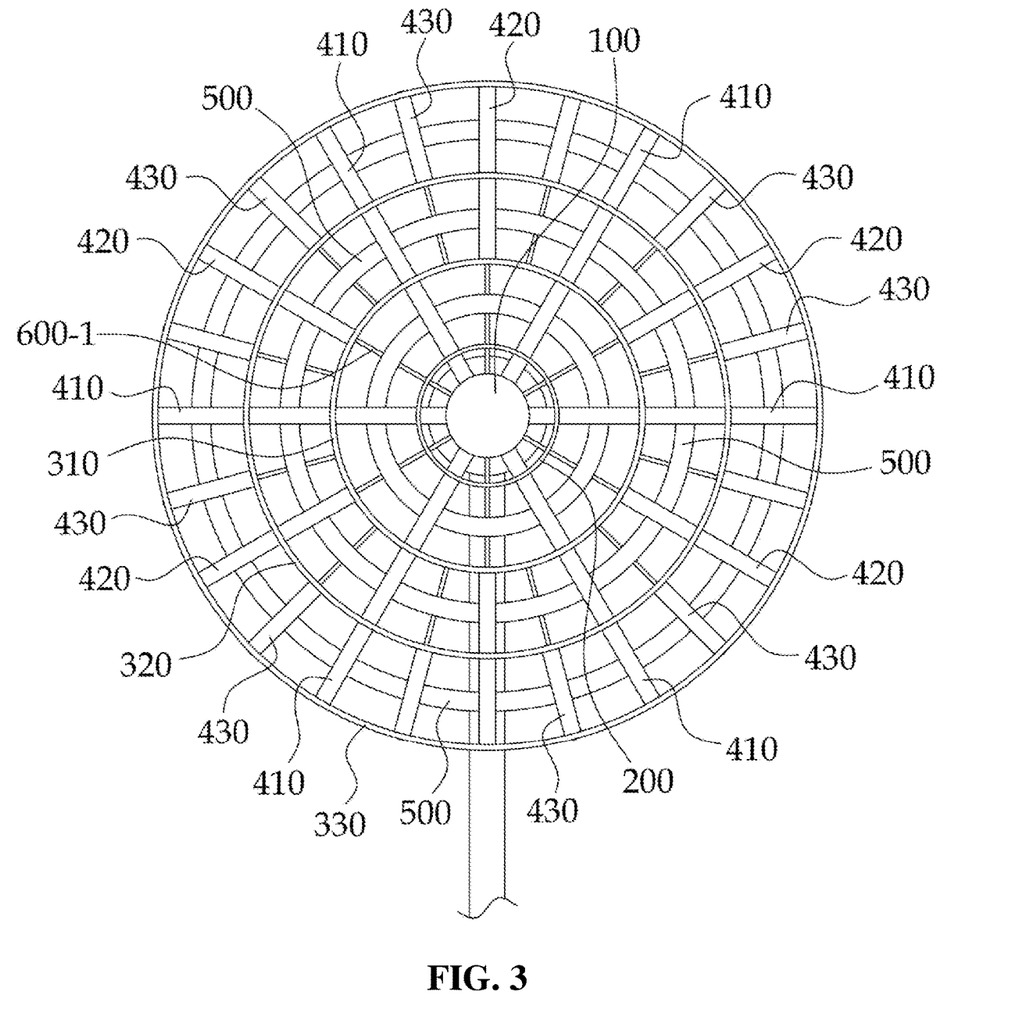
FIG. 3 is a front view showing the high-power-generating vortex windmill apparatus of an integral rotor according to the embodiment.
Figure 4:
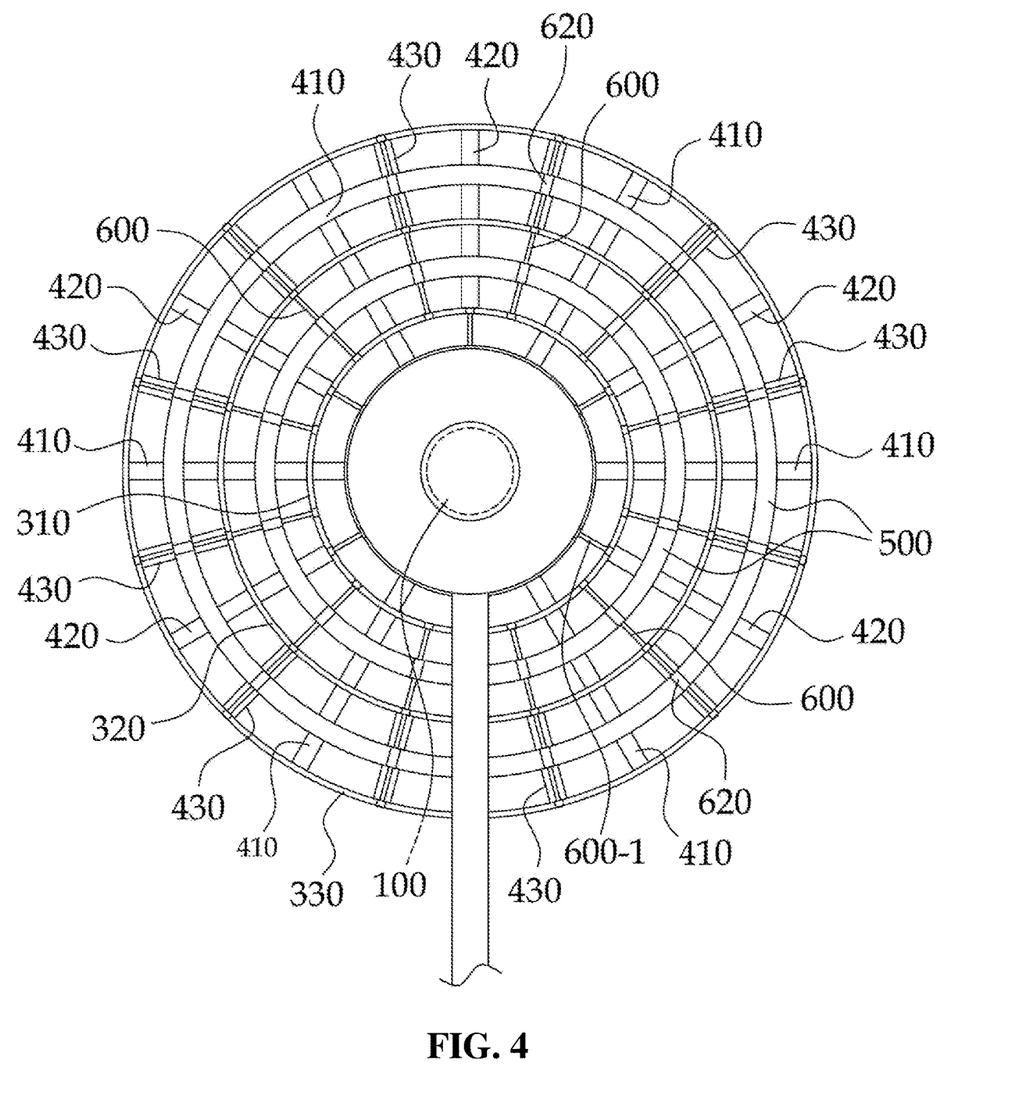
FIG. 4 is a rear view showing the high-power-generating vortex windmill apparatus of an integral rotor according to the embodiment.

As shown in FIGS. 1 to 3, the high-power-generating vortex windmill apparatus, which is configured to generate high-power by using a multi-stage vortex windmill wing, of an integral rotor according to the embodiment, the high-power-generating vortex windmill apparatus includes:

a central shaft fence 200 coupled to an outside portion of a rotary shaft 100 to be spaced apart from the rotary shaft 100;

a plurality of boundary fences 310, 320, and 330 concentrically coupled to an outside portion of the central shaft fence 200 and arranged to be spaced apart from each other, and coupled to each other to have different diameters from the inside space to the outside space;

a plurality of first circumferential wings 410 each of which one end is coupled to the rotary shaft 100, radially arranged, and coupled to the central shaft fence 200 and the plurality of boundary fences 310, 320, and 330 by passing therethrough;

a plurality of second circumferential wings 420 inserted among the plurality of boundary fences 310, 320, and 330 and each of which opposite ends are coupled to opposite boundary fences of the boundary fences 310, 320, and 330, and radially arranged around the rotary shaft 100;

a plurality of slipstream rings 500 inserted among the plurality of boundary fences 310, 320, and 330 and concentrically arranged; and a slipstream ring support 600 simultaneously attached and fixed to the plurality of slipstream rings 500, and installed such that opposite ends thereof respectively connect an inner boundary fence 310 to an outer boundary fence 320, 330.

The central shaft fence 200 has a cylindrical shape, and is coupled to the outside portion of the rotary shaft 100 and arranged to be spaced apart from the rotary shaft 100.

Then, at least one boundary fence 310, 320, 330 is concentrically arranged around the central shaft fence 200.

The plurality of boundary fences 310, 320, and 330 arranged as described above is defined, for convenience of description, into a first boundary fence 310 from the inside space and a third boundary fence 330 at the outmost portion.

Of course, it is natural that the number of the plurality of boundary fences 310, 320, and 330 may be increased or decreased as necessary.

The first circumferential wings 410 are radially coupled from the rotary shaft 100 to the plurality of boundary fences 310, 320, and 330 so as to connect the plurality of boundary fences 310, 320, and 330 to each other, and are assembled by passing through and coupled to the plurality of boundary fences 310, 320, and 330.

Then, the second circumferential wings 420 are radially arranged while coupling the first, second, and third boundary fences 310, 320, and 330 to each other and are prevented from overlapping with the first circumferential wings 410.

Furthermore, third circumferential wings 430 are radially arranged while coupling the second and third plurality of boundary fences 320 and 330 to each other and are prevented from overlapping with the first and second circumferential wings 410 and 420.

The above-described first, second, and third circumferential wings 410, 420, and 430 rotate with wind power, thereby generating a rotating force.

Therefore, as the number of the circumferential wings 410, 420, and 430 increases, more high-power may be made possible.

The slipstream rings 500 are respectively arranged among the first, second and third boundary fences 310, 320, and 330.

Therefore, since the slipstream rings 500 are respectively arranged among the three boundary fences 310, 320, and 330, three slipstream rings 500 are included.

The number of the slipstream rings 500 and the boundary fences 310, 320, and 330 is only an example, and is not limited thereto.

In order to connect the first, second, and third boundary fences 310, 320, and 330 and the plurality of slipstream rings 500 arranged among the boundary fences to each other, the slipstream ring support 600 is mounted.

The slipstream ring support 600 passes through and is coupled to a protrusion formed on a rear surface of the plurality of slipstream rings 500 so as to connect the plurality of slipstream rings 500 together. Opposite ends of the slipstream ring support 600 are respectively mounted to the inner first boundary fence 310 and the third boundary fence 330 so as to connect the inner first boundary fence 310 to the third boundary fence 330.

Otherwise, the slipstream ring support 600 may be divided. For example, a slipstream ring support 600-1 for fixing the innermost slipstream ring 500 (at a location close to the rotary shaft 100) passes through and is coupled to the first boundary fence 310 and the central shaft fence 200 and an end of the slipstream ring support 600-1 is attached to the rotary shaft 100.

As described above, as the plurality of slipstream rings 500 is respectively attached to the plurality of boundary fences 310, 320, and 330 by using the slipstream ring supporters 600 and 600-1, the slipstream rings 500 may be fixed and be solidly maintained.

Meanwhile, according to another embodiment, as shown in FIG. 3,

The apparatus may include a slipstream ring supporter 700, and the slipstream ring supporter 700 is vertically installed with opposite ends thereof respectively connected to a lower surface of a slipstream ring 500 and an upper surface of a second circumferential wing 420.

The slipstream ring support 600 or the slipstream ring supporter 700 described above may be simultaneously installed or one of the two parts may be selectively installed.

Hereinbelow, operation of the embodiment of the present disclosure described above will be described.

FIG. 7 is a graph comparing the number of revolutions at the same wind speed when 8 circumferential wings are provided.

The line consisting of O-shaped circles shows the separated type of the circumferential wing and the slipstream ring, and the line consisting of black circles shows the integrated type of the circumferential wing and the slipstream ring according to the embodiment of the present disclosure.

Referring to the graph, a rotation speed is substantially the same as a rotating speed of the related art, and there is little difference in performance therebetween.

The present disclosure is not limited to the embodiments and the accompanying drawings, and various modifications, additions and substitutions are possible, without departing from the scope and spirit of the invention, and modifications and application with respect to the features of the present disclosure are included within the scope of the present disclosure.

DESCRIPTION OF REFERENCE NUMERALS

100: rotary shaft
200: central shaft fence
310, 320, 330: boundary fence
410: first circumferential wing
420: second circumferential wing
430: third circumferential wing
500: slipstream ring
600: slipstream ring support
700: slipstream ring supporter.

The invention claimed is:

1. A high-power-generating vortex windmill apparatus, which is configured to generate high power by using a multi-stage vortex windmill wing, of an integral rotor, the apparatus comprising:
    a central shaft fence coupled to an outside portion of a rotary shaft to be spaced apart from the rotary shaft;
    a plurality of boundary fences concentrically coupled to an outside portion of the central shaft fence and arranged to be spaced apart from each other, and coupled to each other to have different diameters from an inside space to an outside space;
    a circumferential wing of which one end is coupled to the rotary shaft, radially arranged, and coupled to the central shaft fence and the plurality of boundary fences by passing therethrough;
    a plurality of slipstream rings respectively inserted among the plurality of boundary fences and concentrically arranged; and
    a slipstream ring support simultaneously attached and fixed to the plurality of slipstream rings, installed such that opposite ends thereof respectively connect an inner boundary fence to an outer boundary fence.

2. The apparatus of claim 1, wherein the slipstream ring support penetrates through and is coupled to a protrusion formed on a rear surface of each of the plurality of slipstream rings and connects the plurality of slipstream rings to each other.

3. The apparatus of claim 2, wherein the slipstream ring support is divided.

4. The apparatus of claim 3, wherein the slipstream ring support fixing the inner slipstream ring located adjacent to the rotary shaft is coupled to a first boundary fence and the central shaft fence by passing therethrough, and an end of the slipstream ring support is attached to the rotary shaft.

5. The apparatus of claim 1, further comprising:
    a slipstream ring supporter of which opposite ends are respectively connected to a lower surface of the plurality of slipstream rings and an upper surface of a second circumferential wing.

6. The apparatus of claim 1, wherein the circumferential wing is one of a plurality of circumferential wings inserted among the plurality of boundary fences, and each has opposite ends that are respectively coupled to the plurality of boundary fences.

\* \* \* \* \*